United States Patent
Villena et al.

(10) Patent No.: US 10,051,142 B1
(45) Date of Patent: Aug. 14, 2018

(54) ADAPTIVE DISPLAY OF IMAGE CAPACITY FOR A CAMERA

(71) Applicant: Google Inc., Mountain View, CA (US)

(72) Inventors: Arneil Villena, Santa Clara, CA (US); Todd Wallace Zabel, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/161,128

(22) Filed: May 20, 2016

(51) Int. Cl.
- H04N 5/77 (2006.01)
- H04N 1/21 (2006.01)
- H04N 5/90 (2006.01)
- H04N 5/232 (2006.01)
- H04N 5/907 (2006.01)
- H04N 101/00 (2006.01)

(52) U.S. Cl.
CPC ......... H04N 1/2125 (2013.01); H04N 1/2158 (2013.01); H04N 1/2166 (2013.01); H04N 5/23293 (2013.01); H04N 5/772 (2013.01); H04N 5/907 (2013.01); H04N 2101/00 (2013.01); H04N 2201/0084 (2013.01); H04N 2201/214 (2013.01)

(58) Field of Classification Search
CPC .... H04N 1/2125; H04N 5/772; H04N 1/2158; H04N 5/907; H04N 5/23293; H04N 1/2166; H04N 2201/0084; H04N 2101/00; H04N 2201/214
See application file for complete search history.

(56) References Cited

U.S. PATENT DOCUMENTS

| 4,746,993 A | 5/1988 | Tada |
| 6,122,411 A | 9/2000 | Shen et al. |

(Continued)

FOREIGN PATENT DOCUMENTS

| EP | 2397938 | 12/2011 |
| JP | 2003-150417 | 5/2003 |

(Continued)

OTHER PUBLICATIONS

"No Strings Attached: Sleek, Connected and Cloud-Based Action Video Camera Launches in US", iON USA, https://usa.ioncamera.com/no-strings-attached-sleek-connected-and-cloud-based-action-video-camera-launches-in-us/ (downloaded Sep. 2, 2015), May 22, 2012, 5 pages.

(Continued)

Primary Examiner — Jason A Flohre
(74) Attorney, Agent, or Firm — IP Spring

(57) ABSTRACT

Implementations relate to adaptive display of image capacity for an image capture device. In some implementations, a computer-implemented method to display available image capacity for an image capture device includes determining local storage capacity of local storage accessible to the image capture device and determining whether secondary storage is accessible to the image capture device over a network. The method includes determining total storage capacity based at least in part on the determining whether the secondary storage is accessible. The method determines image capture settings of the image capture device, calculates the available image capacity based on the total storage capacity and the image capture settings, and causes the available image capacity to be displayed.

20 Claims, 5 Drawing Sheets

(56) References Cited

U.S. PATENT DOCUMENTS

| | | | |
|---|---|---|---|
| 6,967,675 B1* | 11/2005 | Ito | H04N 5/23293 348/207.1 |
| 7,640,406 B1 | 12/2009 | Hagerstrom et al. | |
| 8,385,950 B1 | 2/2013 | Wagner | |
| 2003/0097418 A1 | 5/2003 | Yajima | |
| 2004/0090539 A1* | 5/2004 | Kim | H04N 5/772 348/231.1 |
| 2007/0147769 A1* | 6/2007 | Nagaoka | H04N 5/23293 386/224 |
| 2007/0220220 A1 | 9/2007 | Ziv et al. | |
| 2008/0064377 A1* | 3/2008 | Mori | H04N 5/77 455/414.1 |
| 2008/0106601 A1 | 5/2008 | Matsuda | |
| 2008/0250024 A1 | 10/2008 | Kvm et al. | |
| 2009/0086271 A1* | 4/2009 | Shiokawa | H04N 1/32122 358/1.16 |
| 2009/0141795 A1* | 6/2009 | Horie | H04N 5/232 375/240.03 |
| 2009/0219413 A1* | 9/2009 | Hidaka | G11B 27/034 348/231.99 |
| 2012/0016838 A1 | 1/2012 | Arai et al. | |
| 2012/0226663 A1 | 9/2012 | Valdez et al. | |
| 2013/0227082 A1 | 8/2013 | Lin | |
| 2014/0032666 A1 | 1/2014 | Chan et al. | |
| 2014/0032833 A1 | 1/2014 | Cudak et al. | |
| 2014/0129627 A1 | 5/2014 | Baldwin et al. | |
| 2014/0132798 A1* | 5/2014 | Li | H04N 5/232 348/231.1 |
| 2014/0156793 A1 | 6/2014 | Chan et al. | |
| 2014/0181443 A1 | 6/2014 | Kottomtharayil et al. | |
| 2014/0192228 A1* | 7/2014 | Lee | H04N 5/23229 348/231.1 |
| 2014/0300769 A1* | 10/2014 | Hartford | H04N 5/23203 348/222.1 |
| 2014/0337327 A1 | 11/2014 | Barton | |
| 2015/0341561 A1* | 11/2015 | Petrescu | H04N 5/23222 348/333.02 |
| 2015/0373181 A1 | 12/2015 | Rahman et al. | |
| 2016/0140702 A1* | 5/2016 | Kindle | H04N 5/2351 382/167 |
| 2016/0192178 A1* | 6/2016 | Blong | G06F 3/067 455/418 |
| 2016/0373270 A1* | 12/2016 | Yang | H04W 12/06 |

FOREIGN PATENT DOCUMENTS

| | | |
|---|---|---|
| JP | 2014-044268 | 3/2014 |
| WO | 2011/148496 | 12/2011 |
| WO | 2014/030307 | 2/2014 |

OTHER PUBLICATIONS

European Patent Office, International Search Report for International Patent Application No. PCT/US2015/037211, dated Sep. 18, 2015, 5 pages.

European Patent Office, Written Opinion for International Patent Application No. PCT/US2015/037211, dated Sep. 18, 2015, 12 pages.

JPO, Notice of Reasons for Rejection for Japanese Patent Application No. 2016-572644, dated Jan. 15, 2018, 5 pages.

USPTO, Notice of Allowance for U.S. Appl. No. 14/747,677, dated Feb. 15, 2018, 17 pages.

USPTO, Non-Final Office Action for U.S. Appl. No. 14/747,677, dated Nov. 3, 2017, 10 pages.

KIPO, Notice of Preliminary Rejection for Korean Patent Application No. 10-2016-7035805, dated Oct. 16, 2017, 11 pages.

\* cited by examiner

ADAPTIVE DISPLAY OF IMAGE CAPACITY FOR A CAMERA

BACKGROUND

Users of image capture devices such as digital cameras, mobile phones, wearable devices, life-logging cameras, etc. capture images (e.g., take photos or videos) using such devices. The images may be stored locally on the image capture device or uploaded over a network to a secondary storage, where different amounts of storage may be available for different devices and storage methods. Images may require different amounts of storage based on their resolution, type, and/or other properties.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to adaptive display of image capacity for an image capture device. In some implementations, a computer-implemented method to display available image capacity for an image capture device includes determining local storage capacity of local storage accessible to the image capture device and determining whether secondary storage is accessible to the image capture device over a network. The method includes determining total storage capacity based at least in part on the determining whether the secondary storage is accessible. The method determines image capture settings of the image capture device, calculates the available image capacity based on the total storage capacity and the image capture settings, and causes the available image capacity to be displayed.

Various implementations and examples of the method are described. For example, the method can further include, in response to determining that the secondary storage is accessible, determining a secondary storage capacity of the secondary storage. Determining the secondary storage capacity can include sending a query to the secondary storage, and receiving a response from the secondary storage, where the response specifies the secondary storage capacity.

Determining whether the secondary storage is accessible to the image capture device over the network can include determining whether a speed of access to the secondary storage over the network meets a speed threshold, and in response to meeting the speed threshold, determining that the secondary storage is accessible, and in response to not meeting the speed threshold, determining that the secondary storage is not accessible. In another example, determining whether the secondary storage is accessible can include determining whether a connection to the secondary storage over the network meets a reliability threshold, and in response to meeting the reliability threshold, determining that the secondary storage is accessible, and in response to not meeting the reliability threshold, determining that the secondary storage is not accessible.

Determining the local storage capacity of the image capture device can include determining a first storage capacity of a first non-volatile memory of the image capture device, where the first non-volatile memory is non-removable, and/or a second storage capacity of a second non-volatile memory coupled to the image capture device and accessible without use of the network, where the second non-volatile memory is removable. The second non-volatile memory can be part of a removable storage device physically coupled to the image capture device, and determining the local storage capacity can include calculating a sum of the first storage capacity and the second storage capacity.

Determining the image capture settings can include determining a resolution, an aspect ratio, a compression setting, and/or a camera mode. The method can further include automatically adjusting the image capture settings of the image capture device based on the available image capacity. Calculating the available image capacity can include determining an average size of images captured with the image capture settings, and dividing the total storage capacity by the average size to obtain an available image count. The method can cause the available image count to be displayed. The method can further include determining a rate of image capture for the image capture device, and calculating a time duration based on the rate of image capture and the available image count, where the time duration can be displayed. Determining the rate of image capture for the image capture device can include determining a past rate of image capture based on historical data about the image capture device. In some implementations, determining the rate of image capture can include calculating a predicted rate of image capture, where the predicted rate of image capture is based on a current location of the image capture device, a current time, and/or an identity of the network. The image capture device can be associated with a user and determining the rate of image capture can include identifying one or more events in a schedule of the user, and determining the rate of image capture based on the one or more events.

The method can further include outputting an option by the image capture device allowing user input to be received to change one or more of the image capture settings, where the option is output based on the available image capacity. Some implementations can include determining and outputting by the image capture device one or more suggested save settings that indicate to adjust the available image capacity in at least one of the local storage and the secondary storage, and receiving user input selecting at least one of the suggested save settings.

In some implementations, an image capture device includes a local storage coupled to a processor, a network interface coupled to the processor, a camera coupled to the processor, and a display coupled to the processor, where the processor is configured to perform operations. The operations include determining local storage capacity of local storage accessible to the image capture device, and determining whether a secondary storage is accessible to the image capture device over a network. The operations include determining total storage capacity, which includes setting the total storage capacity as a sum of the local storage capacity and a secondary storage capacity of the secondary storage in response to determining that the secondary storage is accessible, and setting the total storage capacity as the local storage capacity in response to determining that the secondary storage is not accessible. The operations include determining image capture settings of the image capture device, calculating the available image capacity based on the total storage capacity and the image capture settings, and causing the available image capacity to be displayed.

Various implementations and examples of the image capture device are described. For example, the processor can be further configured to perform operations comprising determining whether access to the secondary storage over the network meets a speed threshold and a reliability threshold. In response to determining that access meets the speed threshold and the reliability threshold, the processor is configured to determine that the secondary storage is accessible. The processor can be further configured to perform operations including determining an average size of images captured with the image capture settings, and dividing the total storage capacity by the average size to obtain an available image count, where causing the available image capacity to be displayed comprises displaying the available image count.

In some implementations, a computer readable medium can have stored thereon instructions that, when executed by a processor, cause the processor to display available image capacity for an image capture device. The instructions cause the processor to determine local storage capacity of local storage accessible to the image capture device and determine that a secondary storage is accessible to the image capture device over a network. Based at least in part on determination of that the secondary storage is accessible, the instructions cause the processor to determine total storage capacity as a sum of the local storage capacity and a secondary storage capacity of the secondary storage. The instructions cause the processor to determine image capture settings of the image capture device, calculate the available image capacity based on the total storage capacity and the image capture settings, and cause the available image capacity to be displayed.

In some implementations of the computer readable medium, further instructions cause the processor to determine an average size of images captured with the image capture settings, divide the total storage capacity by the average size to obtain an available image count, determine a rate of image capture for the image capture device, and calculate a time duration based on the rate of image capture and the available image count, where the time duration is displayed as the available image capacity.

DETAILED DESCRIPTION

Figure 1:
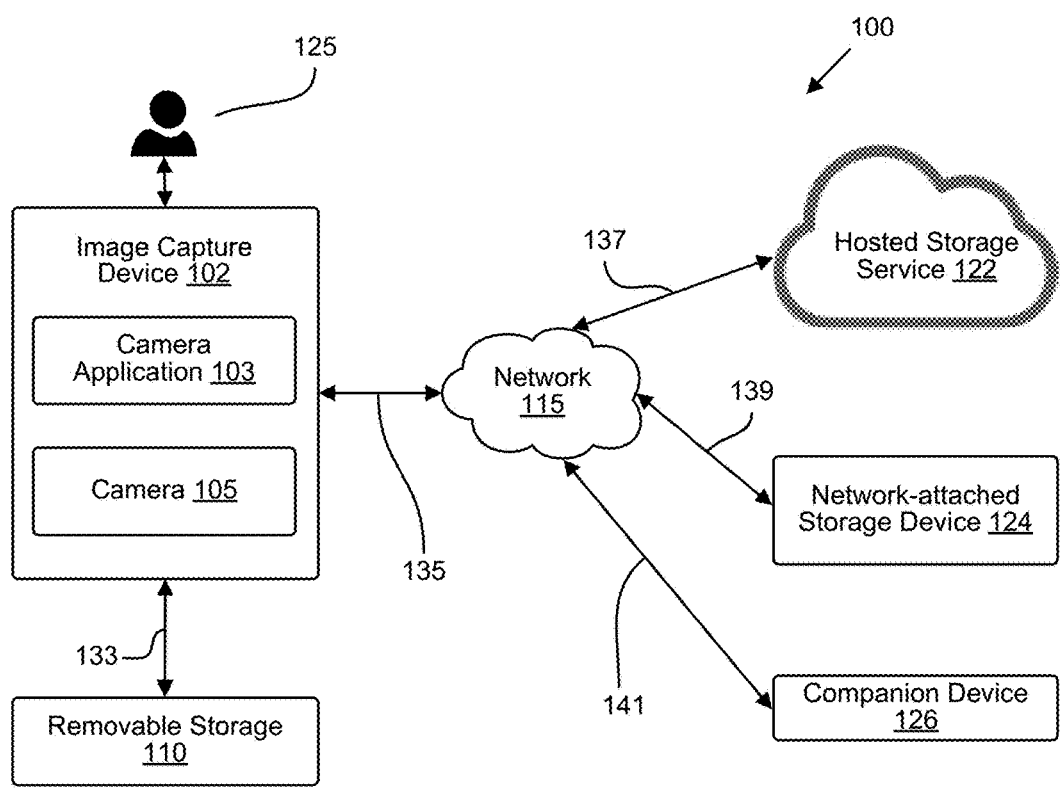
FIG. 1 illustrates an example environment in which an image capture device displays image capacity, according to some implementations.

Techniques described herein relate to determining and displaying available image capacity for an image capture device. Some implementations may include an image capture device and a method to display available image capacity for the image capture device.

In some implementations, images captured by an image capture device may be stored locally in non-removable storage of the image capture device, e.g., a built-in storage device such as a solid state storage device or a hard disk drive. Captured images may alternatively be stored in removable storage physically coupled to the image capture device, e.g., a memory card, a removable storage device such as a USB storage drive, etc. In these implementations, the images may also be stored in a secondary storage device by transferring the images over a network. In some implementations, the secondary storage may be included in a companion device accessed by the image capture device over the network.

In some implementations, available image capacity may be determined as a sum of available local storage capacity and available secondary storage capacity. For example, available local storage capacity may include the capacity of non-removable storage of the image capture device. In another example, available local storage capacity may include the capacity of removable storage devices physically coupled to the image capture device. For example, available secondary storage capacity may include the capacity of secondary storage accessible over a network. The available secondary storage capacity may be determined as zero if the secondary storage is inaccessible over a network. For example, the secondary storage may be determined as inaccessible over the network if there is no network connectivity for the image capture device. In another example, the secondary storage may be determined as inaccessible if a speed of access to the secondary storage over the network does not meet a speed threshold. In another example, the secondary storage may be determined as inaccessible if the connection to the secondary storage over the network does not meet a reliability threshold.

In some examples, the secondary storage capacity may be determined as the available secondary storage capacity of the secondary storage, when the secondary storage is accessible over the network. For example, the secondary storage capacity may be determined as a remainder of a quota allotted to the user by a hosted storage service, e.g., 1 GB, 5 GB, unlimited, etc.

In some implementations, image capture settings of the image capture device may be determined. For example, the image capture settings may include a resolution for images captured by the image capture device, e.g., VGA, 720p, 1080p, 4K, 5K, 8K, etc. In another example, the image capture settings may include an aspect ratio for images captured by the image capture device, e.g., 4×3, 16×9, 5×4, etc. In another example, the image capture settings may include a compression setting for images captured by the image capture device, e.g., no compression, lossless compression, high compression, etc. In some implementations, determining image capture settings may include determining a camera mode. For example, the camera mode may be a photo sphere mode, a panorama mode, a lens blur mode, a video mode, and a plain mode.

In some implementations, the available image capacity may be calculated based on image capture settings of the image capture device and the available storage capacity. For example, the available image capacity may be determined as an available image count, a time duration, etc. For example, the available image count may be higher for a low resolution (e.g., 720p) compared to a high resolution (e.g., 4K), for the same available storage capacity. In another example, the available image count may be higher in certain camera modes, e.g., higher for plain (e.g., photo) mode than that for video mode. In some implementations, the available image capacity may further be calculated based on a rate of image capture.

In various implementations, the available image capacity may be displayed, e.g., by the image capture device and viewable by a user. For example, the available image capacity may be displayed as an available number of images (e.g., photos or videos) that can be captured and stored in the available storage. The number may be displayed as a ratio of captured images over a total number of images that can be captured given available storage or a total number of seconds that can be captured for videos. In another example, available image capacity may be displayed as an available duration of time (e.g., in minutes or hours) for the image capture device. For example, the duration of time may be calculated based on a standard or determined rate of capture of images for the image capture device. Some implementations can output notifications, options, and/or suggestions related to available image storage capacity, image capture settings, types of available storage, transfer of images and videos to other storage, etc. and allow the user to select desired options.

Features described herein allow determination and display of available capacity of an image capture device to store images. The available capacity can be determined based on local storage as well as secondary storage, e.g., remote storage on servers. Such features can assist a user in determining how many images may be captured by a device before having to take actions to free up used storage space. For example, in general, a user may be unaware of the storage capacity currently available to store images when the images are stored in secondary storage that is accessed over a network. A user may not know whether the secondary storage is currently accessible over the network, or whether the secondary storage is running out of space (e.g., based on a quota of storage allocated to the user). The user may run out of storage capacity, e.g., at an important event such as a family gathering, a vacation, etc., if the secondary storage is unavailable. Described features can inform the user of available storage capacity in a clear manner. For example, various options allow display of available storage capacity in terms of number of images, duration of video, an estimated time period based on a past and/or predicted rate of image capture, particular available storage devices, etc. Furthermore, described features can automatically adjust, prompt the user to adjust, and/or suggest adjustment of image capture settings and/or used storage devices to allow a greater amount of images and greater duration of video to be captured and stored.

The described features can allow a device to more efficient use device resources such as storage capacity without significant time and processing requirements. Described techniques provide accurate and clear output of available storage capacity of image capture devices including secondary storage, and provide options to efficiently utilize remaining storage capacity, allowing more efficient utilization of storage resources. For example, tedious manual reviewing of image storage capacity and user confusion in storage of images by an image capture device can be avoided. Consequently, a technical effect of one or more described implementations is that operation of image capture devices is reduced in computational time and resources expended to obtain results. For example, a technical effect of described features is a reduction in the problem of consumption of system storage resources required for storage of images.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates an example environment in which an image capture device displays image capacity, according to some embodiments. The illustrated environment 100 includes an image capture device 102 coupled to a removable storage 110. Environment 100 also includes a hosted storage service 122, a network-attached storage device 124, and a companion device 126. While FIG. 1 shows one of each of image capture device 102, removable storage 110, hosted storage service 122, network-attached storage device 124, and companion device 126, any number of these entities may be present in environment 100. In various implementations, one or more of removable storage 110, hosted storage service 122, network-attached storage device 124, and companion device 126 may not be present. A user 125 may be associated with the image capture device 102. In some implementations, the environment 100 may include components not shown in FIG. 1.

In the illustrated implementation, removable storage 110 is physically coupled to the image capture device 102 and can include local storage. In various implementations, removable storage 110 may be any kind of non-volatile storage device, such as a hard disk drive, a tape, an optical disk, a memory card, a solid-state drive, and the like. In some examples, removable storage 110 may be inserted in a physical slot, such as, e.g., CD-ROM drive tray, DVD-ROM drive slot, tape drive slot, a card reader slot, etc. In some examples, removable storage 110 may be coupled to the image capture device by a cable, such as a Universal Serial Bus (USB) cable, a serial cable, etc. In these implementations, removable storage 110 may be removed non-destructively from the image capture device 102, e.g., by ejecting from the physical slot, by disconnecting the cable etc.

In the illustrated implementation, the hosted storage service 122, the network-attached storage device 124, the companion device 126, and the image capture device 102 are communicatively coupled via a network 115. The network 115 may be a conventional type, wired or wireless, and may have numerous different configurations including a star configuration, token ring configuration, or other configurations. Furthermore, the network 115 may include a local area network (LAN), a wide area network (WAN) (e.g., the Internet), and/or other interconnected data paths across which multiple devices may communicate. In some implementations, the network 115 may be a peer-to-peer network.

The network 115 may also be coupled to or include portions of a telecommunications network for sending data in a variety of different communication protocols. In some implementations, the network 115 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 115, in practice one or more networks 115 may be coupled to these entities.

In some implementations, the image capture device 102 may be a computing device that includes a memory and a hardware processor, for example, a camera, a laptop computer, a desktop computer, a tablet computer, a mobile telephone, a wearable device, a head-mounted display, a portable game player, a portable music player, a reader device, a television with one or more processors embedded therein or coupled thereto, or other electronic device capable of accessing the network 115. The memory included in image capture device 102 can include local storage, e.g., non-removable and/or built-in storage for the device 102, such as a solid state storage device or a hard disk drive. In the illustrated implementation, the image capture device 102 is coupled to the network 115 via signal line 135. Signal line 135 may be a wired connection, such as Ethernet, coaxial cable, fiber-optic cable, etc., or a wireless connection, such as Wi-Fi, Bluetooth, or other wireless technology. In some implementations, the image capture device 102 sends and receives data to and from other entities coupled to the network via the network 115.

The image capture device 102 may include a camera application 103 and a camera 105. For example, the camera application 103 may include code and routines operable to display image capacity. In some implementations, the image application 103 may be implemented using hardware including a field-programmable gate array (FPGA) or an application-specific integrated circuit (ASIC). In some implementations, the image application 103 may be implemented using a combination of hardware and software.

In some implementations, the image capture device 102 can be a mobile device that is included in a wearable device worn by the user 125. For example, the image capture device 102 is included as part of a clip (e.g., a wristband), part of jewelry, or part of a pair of glasses. In another example, the image capture device 102 can be a smart watch. The image capture device 102 can display images from the camera application 103 on a display of the device worn by the user 125. For example, the user 125 can view the images on a display of a smart watch or a smart wristband.

The camera application 103 can include any type of application 103 stored on the image capture device 102. For example, the camera application 103 can include a mobile application that runs on the image capture device 102. For example, the user 125 may capture images using the user device 102 using camera application 103. The camera application 103 may transmit the images to other devices or entities, e.g., one or more of hosted storage service 122, network-attached storage device 124, and companion device 126, via the network 115. Although the camera application 103 is described with reference to images, the implementations described herein may work with any type of visual media including three-dimensional imagery, animated images, videos, virtual reality video, holographic video, etc. Some implementations described herein can work with other types of media data, e.g., audio data (e.g., alone or in association with other media data such as video), etc.

Various forms of secondary storage (e.g., remote storage) can be in communication with and accessible by the image capture device 102 over network 115. The hosted-storage service 122 may be provided, e.g., by a service provider that provides one or more storage services over a network. For example, hosted-storage service 122 may be a general purpose Internet-based storage service accessible via the network 115. In various examples, the hosted storage service may be accessible via an Application Programming Interface (API), Remote Procedure Call (RPC), or other mechanisms over the Internet. The hosted-storage service 122 is communicatively coupled to the network 115 via signal line 137. Signal line 137 may be a wired connection, such as Ethernet, coaxial cable, fiber-optic cable, etc., or a wireless connection, such as Wi-Fi, Bluetooth, or other wireless technology. In some implementations, the image capture device 102 sends and receives data to and from the hosted-storage service 122 via the network 115.

The network-attached storage device 124 may be any physical device, e.g., a disk drive, or a virtual-device, e.g., a virtual disk drive, that can be accessed over the network 115. For example, the network-attached storage device 124 may be part of a Network-Attached Storage (NAS), a Storage-Area Network (SAN), a virtual hard disk drive mounted via an operating system of the image capture device 102, etc. The network-attached storage device 124 is communicatively coupled to the network 115 via signal line 139. Signal line 139 may be a wired connection, such as Ethernet, coaxial cable, fiber-optic cable, etc., or a wireless connection, such as Wi-Fi, Bluetooth, or other wireless technology. In some implementations, the image capture device 102 sends and receives data to and from the network-attached storage device 124 via the network 115. In some implementations, the network 115 may include the Internet. In some implementations, the network 115 may be a private network, e.g., a personal network or a corporate network, such that the image capture device 102 sends and receives data to and from the network-attached storage device 124 without the data traveling on a public network such as the Internet.

The companion device 126 may be any device, e.g., a backup disk, a network router, a media server, a mobile phone, a tablet, a hardware storage device such as a portable hard drive, a portable computer, a second image-capture device, etc. The companion device 126 may include non-volatile memory, such as a hard disk drive, a solid-state drive, an optical disk drive, etc. that is capable of storing data. The companion device 126 is communicatively coupled to the network 115 via signal line 141. Signal line 141 may be a wired connection, such as Ethernet, coaxial cable, fiber-optic cable, etc., or a wireless connection, such as Wi-Fi, Bluetooth, or other wireless technology. In some implementations, the image capture device 102 sends and receives data to and from the companion device 126 via the network 115. In some implementations, the network 115 may be a private network, e.g., a personal network or a corporate network, such that the image capture device 102 sends and receives data to and from the companion device 126 without the data traveling on a public network such as the Internet. In some examples, the network 115 may be a local network, e.g., a Bluetooth-based network, or other wireless network, that couples and enables direct data exchange between the image capture device and the companion device 126.

In some implementations, the secondary storage for the image capture device 102 may include a network-attached storage device 124, e.g., a storage disk coupled to the network and accessible over the network. In some implementations, the secondary storage may include storage provided by a hosted storage service 122 (e.g., a cloud-based storage service, or other remote storage service). For example, the hosted storage service may be accessible over the network via file transfer protocol (FTP), hypertext transfer protocol (HTTP), and the like. In some implementations, secondary storage for the image capture device 102 may include storage of one or more companion devices 126.

Figure 2:
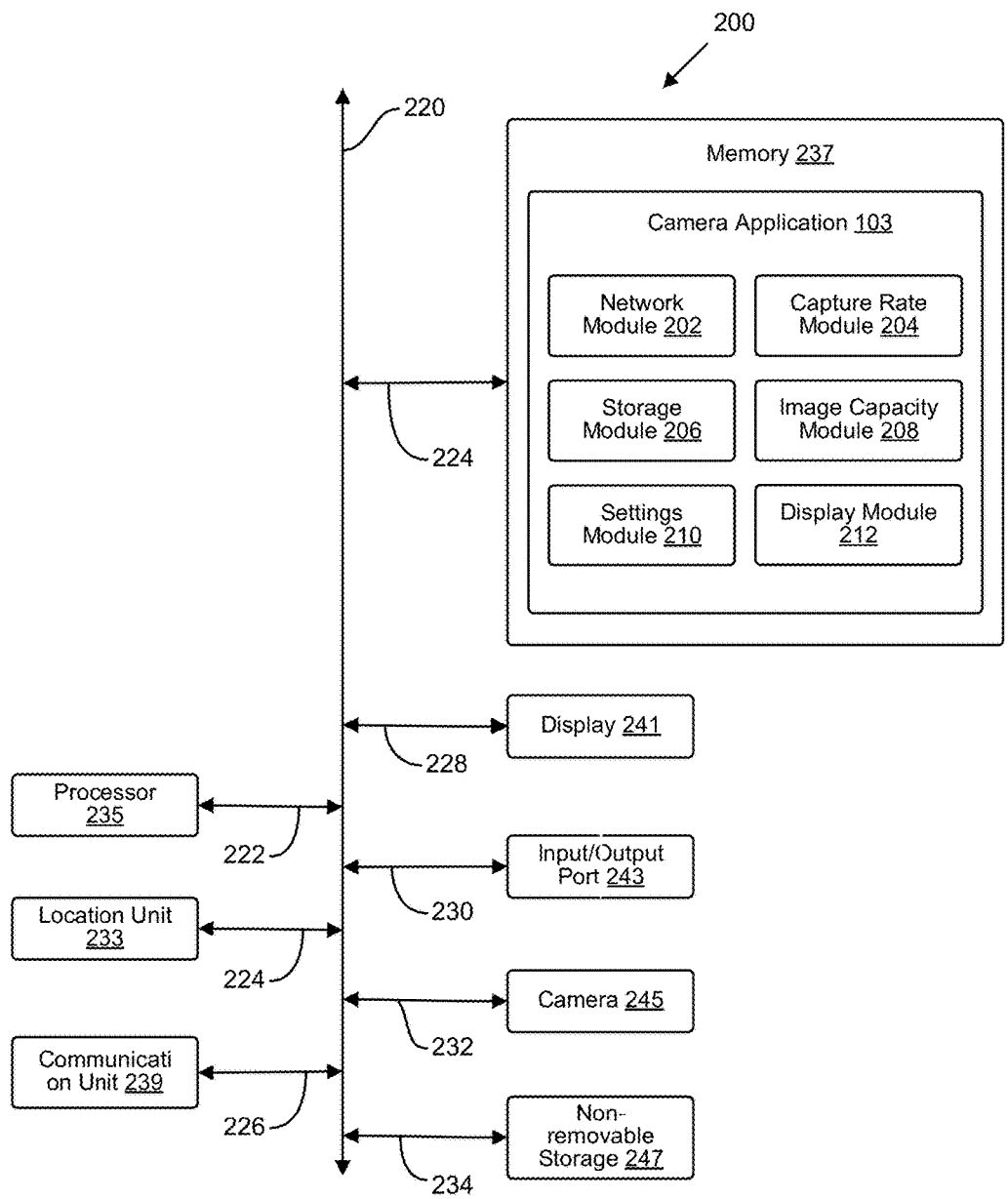
FIG. 2 illustrates a block diagram of an example image capture device that displays image capacity, according to some implementations.

FIG. 2 illustrates a block diagram of an example image capture device 200 that displays available image capacity. The image capture device 200 may include a location unit 233, a processor 235, a memory 237, a communication unit 239, a display 241, one or more input/output ports 243, a camera 245, and a non-removable storage 247. A camera application 103 may be stored in the memory 237. The components of the image capture device 200 may be communicatively coupled by a bus 220.

The location unit 233 includes hardware that can provide a location of the image capture device. For example, the location unit 233 may include a global positioning system (GPS) sensor. In various implementations, the location unit 233 may provide a real-time or near real-time location of the image capture device to other units of the image capture device.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD ROM) device, a DVD ROM device, a DVD RAM device, a DVD RW device, a flash memory device, or some other mass storage device for storing information on a more permanent basis. The memory 237 includes code and routines operable to execute the image application 103, which is described in greater detail below. The memory 237 is coupled to the bus 220 for communication with the other components via signal line 224.

The communication unit 239 transmits and receives data, e.g., from the image capture device to one or more of hosted storage service 122, network-attached storage device 124, and companion device 126 over a network, e.g., the network 115. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication. In some implementations, the communication unit 239 includes a wireless transceiver for exchanging data using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the camera application 103. For example, the display 241 may render graphics to display a user interface. The display 241 is coupled to the bus 220 for communication with the other components via signal line 228.

The input/output ports 243 can include hardware to exchange data with one or more peripheral devices. For example, the input/output ports may provide communication with one or more storage devices that can provide local storage in some implementations, For example, the storage devices can include storage drives, e.g., a CD-ROM drive, a DVD drive, etc., that can be used to read data from and/or write data to an optical disk. In another example, the input/output ports may communicate with a card reader, e.g., a card reader that can read data from and/or write data to a storage device, such as a flash memory card. In another example, the input/output ports may include an interface, e.g., a universal serial bus (USB) interface, that can be read data from and/or write data to a connected USB storage. The input/output ports are coupled to the bus 220 for communication with the other components via signal line 230.

The camera 245 can include hardware to capture images, e.g., static images, video, animations, slow motion video, etc. For example, the camera 245 can include hardware sensors, e.g., a Complementary Metal-Oxide Semiconductor (CMOS) sensor, a Charge-Coupled Device (CCD) sensor, or other type of image sensor. The camera 245 can also include one or more lenses, mirrors, flash, etc. The camera 245 is coupled to the bus 220 via signal line 232.

The non-removable storage 247 may be a non-transitory computer-readable storage medium that stores data that provides one or more features described herein, e.g., as local storage. The storage device 247 may be a DRAM device, a SRAM device, flash memory or some other memory device. In some implementations, the non-removable storage 247 also includes a non-volatile memory or similar permanent storage device and media including a hard disk drive, an optical storage device, a flash memory device, or some other mass storage device for storing information on a permanent basis. The non-removable storage 247 is coupled to the bus 220 for communication with the other components via signal line 234.

Other hardware components that provide information to a user may be included as part of the image capture device

200. For example, the image capture device 200 may include a speaker for audio interfaces, a vibration or force feedback device, or other types of non-display output devices. In some implementations, the image capture device 200 may not include all the components. In some implementations, the image capture device 200 may include other components not listed here, e.g., one or more sensors, battery, etc.

In the illustrated implementation shown in FIG. 2, the camera application 103 includes a network module 202, a capture rate module 204, a storage module 206, an image capacity module 208, a settings module 210, and a display module 212. Other modules and/or configurations are possible.

The network module 202 may be operable to exchange data over a network, e.g., network 115. In some implementations, the network module 202 may be a set of instructions executable by the processor 235 to exchange data over the network. In some implementations, the network module 202 may be stored in the memory 237 of the image capture device 200 and can be accessible and executable by the processor 235.

In some implementations, the network module 202 determines accessibility of a secondary storage over network 115, e.g., via communication unit 239. The network module 202 may determine accessibility of the secondary storage, e.g., based on comparison with a speed threshold of a speed of access of the secondary storage over the network, based on comparison with a reliability threshold of a reliability of access of the secondary storage over the network.

In some implementations, when a user of the image capture device provides consent to use of user data, the capture rate module 204 determines a rate of image capture for the image capture device. In various implementations, the rate of image capture may be a past rate of image capture, a predicted rate of image capture, etc. The capture rate module may determine the rate of image capture based on images stored within local storage of the image capture device, e.g., non-removable storage 247 and/or removable storage coupled to the image capture device via input/output port 243. In some implementations, when the user provides consent to use of user data, the capture rate module may determine the rate of image capture based on a user's schedule, based on a location of the image capture device, based on a current time, based on an identity of the network that the image capture device is coupled to, etc. In various implementations, the network module may provide data indicating availability of secondary storage over a network to other modules.

In some implementations, the storage module 206 accesses data from local storage, e.g., the non-removable storage 247, removable storage coupled to the image capture device via input/output port 243, etc., and accesses data from secondary storage coupled to the image capture device via a network, e.g., the network 115. In various implementations, the storage module may read or write one or more images to the local storage and/or the secondary storage. In various implementations, the storage module may provide data indicating local storage capacity and secondary storage capacity to other modules.

In some implementations, the image capacity module 208 calculates available image capacity. For example, the image capacity module 208 calculates available image capacity based on total storage capacity of the local storage and the secondary storage, e.g., provided by the storage module 206 and image capture settings, e.g., provided by the settings module 210.

In some implementations, the settings module 210 stores and enables a user to modify one or more image capture settings, such as a camera mode, a resolution, an aspect ratio, etc. In various implementations, the settings module provides image capture settings to other modules.

In some implementations, the display module 212 displays the available image capacity, e.g., provided by the image capacity module 208, on a user interface, e.g., user interfaces shown in FIG. 5.

While FIG. 2 shows various modules, in different configurations, the functionality of different modules may be combined in single modules or split across additional modules. In some configurations, additional modules that are not shown in FIG. 2 may be included.

Figure 3:
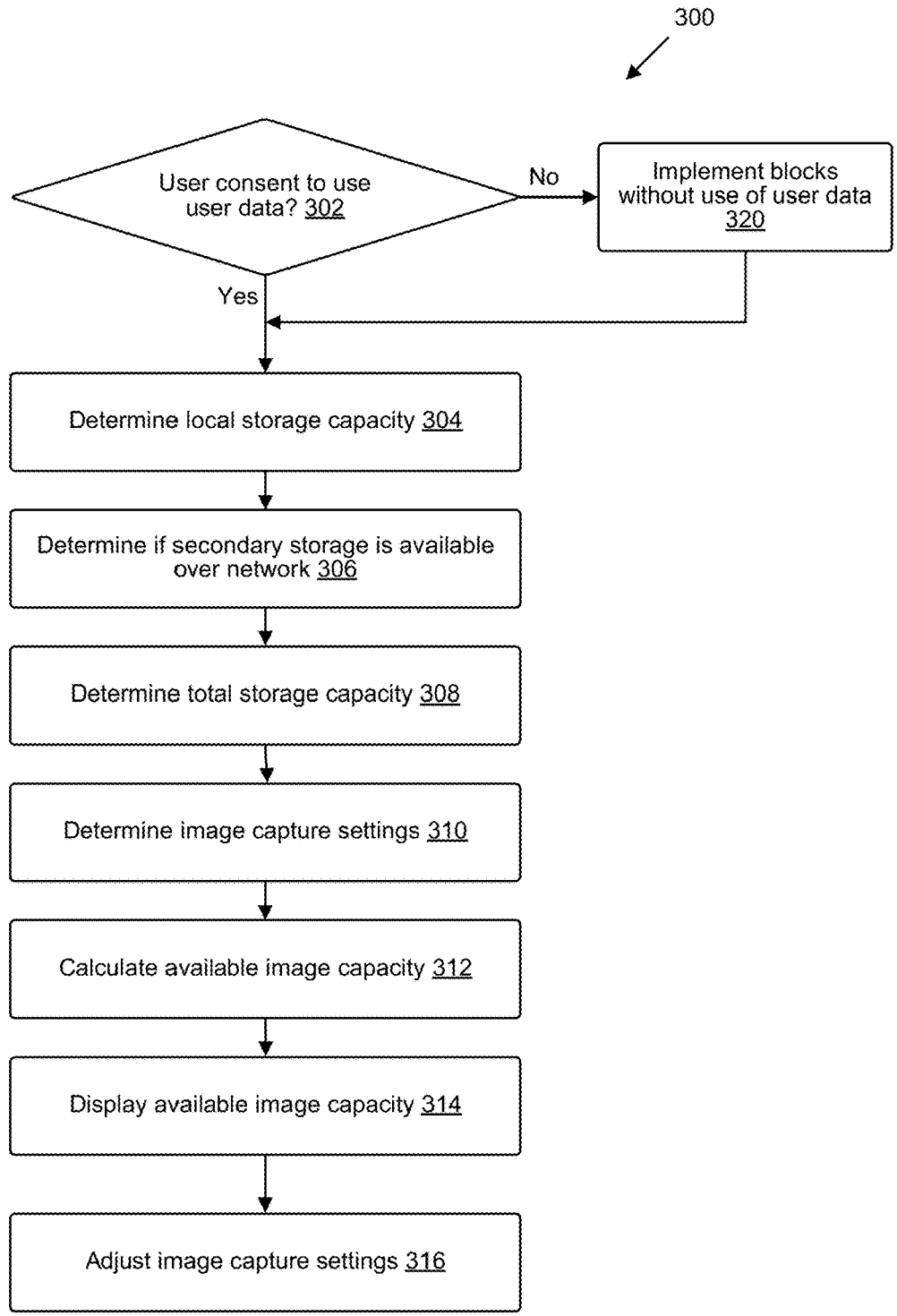
FIG. 3 illustrates a flowchart of an example method to display image capacity, according to some implementations.

FIG. 3 illustrates a flowchart of an example method 300 to display image capacity, according to some implementations.

In block 302, it is checked whether user consent (e.g., user permission) has been obtained to use user data in the implementation of method 300. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. For example, such user data may include image capture settings, e.g., as specified in the settings module 210. In another example, such user data may include a schedule of the user 125, e.g., as specified in a calendar of the user 125. One or more blocks of the methods described herein may use such user data in some implementations. If user consent has been obtained from the relevant users for which user data may be used in the method 300, then it is determined that the blocks of the methods herein can be implemented with possible use of user data as described for those blocks, and the method continues to block 304, with use of user data. If user consent has not been obtained, it is determined in block 320 that blocks are to be implemented without use of user data, and the method continues to block 304, without use of user data. In some implementations, if user consent has not been obtained, the remainder of method 300 is not performed.

Various implementations may obtain user consent in different manners. In some implementations, user consent may be obtained each time user data is accessed, e.g., when the camera application 103 is in operation. In some implementations, user consent may be obtained at a time of launch for the camera application 103. In some implementations, user consent may be obtained when a new source of user data, such as a user's schedule, is accessed for the first time. In various implementations, the user 125 may selectively permit and/or decline access to user data to camera application 103. If it is determined that the user has consented to the use of user data, subsequent blocks of the method are performed with access to user data that the user has consented to. If it is determined that the user has consented to the use of user data, block 304 may be performed. If it is determined that the user has not consented to the use of user data, block 320 may be performed, prior to subsequent blocks of the method.

In block 320, access to user data may be restricted, e.g., to camera application 103. For example, restriction of access may prevent camera application 103 from reading or writing the user data. In some implementations, when the user provides consent, camera application 103 may be selectively permitted to access certain user data, such as a user's schedule. In various implementations, the user data may be anonymized, e.g., delinked from the user's identity, provided in aggregation with user data for other users, etc.

In block 304, local storage capacity may be determined. For example, when the image capture device, e.g., image capture device 102, is not coupled to removable storage, e.g., removable storage 110, the local storage capacity may be determined based on storage integrated within the image capture device. In some implementations, the local storage capacity may be a portion of the available storage capacity of storage integrated within the image capture device. For example, if an operating system of the image capture device does not allocate storage quotas, the local storage capacity may be the entire available capacity of storage integrated within the image capture device. In another example, if the operating system of the image capture device allocates storage quotas, the local storage capacity may be unused capacity within storage allocated to a camera application, e.g., camera application 103, within the storage integrated within the image capture device.

In some implementations, e.g., when the image capture device 102 is coupled to removable storage, the local storage capacity may be determined based on storage accessible to the image capture device without the use of a network. For example, when the image capture device 102 is coupled to the removable storage 110, the local storage capacity may be a sum of the available capacity of storage integrated within the image capture device and the available capacity of the removable storage. For example, if the image capture device has an available capacity of one gigabyte and the removable storage has an available capacity of two gigabytes, the local storage capacity may be determined as three gigabytes. In various examples, storage integrated within the image capture device can be provided as one or more storage devices, e.g., memories and/or storage drives integrated in the image capture device. In various examples, the removable can be provided as one or more storage devices, e.g., one or more memory cards, drives connected locally to the image capture device (e.g., not over a network 115), etc.

In block 306, availability of secondary storage over a network, e.g., network 115, may be determined. In various implementations, one or more of multiple parameters may be evaluated to determine the availability of second storage over a network. Such parameters may include, but are not limited to, a speed of the network, a reliability of the network, etc.

In some implementations, the speed of the network may be determined as a rate of data transfer between an image capture device, e.g., the image capture device 102, and a secondary storage coupled to the image capture device via the network 115, e.g., one or more of the hosted storage service 122, network-attached storage device 124, and companion device 126. In this example, the speed of the network may be determined with various techniques. An example technique to determine speed of the network can include uploading test data, e.g., a relatively small amount of data, to the secondary storage and measuring a time between the start of upload and a time at which storage confirmation is received from the secondary storage. Another example mechanism to determine speed of the network may include determining an upload speed, e.g., in bits per second (bps), for data sent from the image capture device over the network. The speed of the network may be compared to a threshold, e.g., a speed threshold, to determine whether the speed meets the threshold. The speed threshold may be selected, e.g., to ensure that one or more images captured by the image capture device 102, are transferred to the secondary storage within a certain amount of time. In some examples, if the speed of the network meets the speed threshold, e.g., the storage confirmation is received within a threshold time, the upload speed is greater than a threshold bits per second, etc., the secondary storage may be determined as available. If the speed of the network does not meet the speed threshold, the secondary storage may be determined as unavailable. In some implementations, if the speed of the network meets the speed threshold, one of multiple required thresholds (or other tests) is met to determine whether the secondary storage is available.

In some implementations, reliability of the network may be determined using a variety of techniques. An example technique to determine the reliability of the network, e.g., network 115, may be to make periodic transfers of a relatively small amount of data to the secondary storage, e.g., one or more of the hosted storage service 122, network-attached storage device 124, and companion device 126, and receiving confirmation from the secondary storage that the data was stored successfully. In this example, a reliability threshold may be whether a minimum number, e.g., two or more, periodic transfers completed successfully, e.g., confirmation was received from the secondary storage for each of the two or more periodic transfers. In this example, if confirmation is received for the minimum number of period transfers, the network may be determined to meet the reliability threshold. If confirmation is not received for the minimum number of period transfers, the network may be determined to not meet the reliability threshold. In some implementations, the reliability threshold may include whether a minimum number of consecutive periodic transfers were completed successfully. In some implementations, the reliability threshold may include whether the most recent minimum number of consecutive period transfers were completed successfully.

In some implementations, the image capture device and the secondary storage may be synchronized, e.g., using a synchronization protocol. In these implementations, an example technique to determine the reliability of the network may be to determine a synchronization timestamp between the image capture device and the secondary storage, e.g., a time of last synchronization. In this example, the synchronization timestamp may be compared to a current timestamp at the image capture device to determine whether the reliability threshold is met. If the synchronization timestamp is within a certain time, e.g., two minutes, five minutes, one hour, etc. of the current timestamp, the network may be determined to meet the reliability threshold. If the synchronization timestamp is not within the certain time of the current timestamp, the network may be determined to not meet the reliability threshold. In some implementations, meeting the reliability threshold allows the secondary storage to be determined as available, and not meeting the reliability threshold allows the secondary storage to be determined as unavailable. Some implementations can use the reliability threshold as one of multiple thresholds (or other tests) to be met to determine that the secondary storage is available. For example, some implementations may require both speed and reliability thresholds to be met to determine that the secondary storage is available.

In examples where the secondary storage is determined to be available over the network, the storage capacity of the secondary storage may be determined. In some implementations, a query requesting the storage capacity may be sent to the secondary storage. In some examples, e.g., when the secondary storage is a hosted storage service, e.g. hosted storage service 122, the query may be sent using an application programming interface (API) of the hosted storage service. In some examples, e.g., when the secondary storage is a network-attached storage device, e.g., network attached storage device 124, the query may be sent using a storage networking protocol. In some examples, the query may be part of the synchronization protocol, e.g., between the image capture device 102 and the secondary storage. In some examples, e.g., when the secondary storage supports remote procedure call (RPC), the query may be a command for the secondary storage to determine the secondary storage capacity and send a response to the image capture device.

In these examples, a response may be received from the secondary storage, wherein the response specifies the secondary storage capacity. For example, if the secondary storage is a hosted storage service, e.g., a service associated with a user account of user 125, and the user account is associated with a storage plan that has a limit of one terabyte, the response may specify the secondary storage capacity as one terabyte. In this example, if the hosted storage service has two hundred gigabytes of data associated with the user account, the response may specify the secondary storage capacity as eight hundred gigabytes. In another example, if the secondary storage is a hosted storage service, e.g., a service associated with a user account of user 125, and the user account is associated with an unlimited storage plan, the response may specify that the secondary storage capacity is unlimited.

In some examples, e.g., when the secondary storage is a network-attached storage device, the response may specify an available capacity of the network-attached storage device. In some implementations, the response may specify the available capacity of the network as an available storage capacity from a storage quota associated with a user, e.g., user 125.

In some examples, e.g., when the secondary storage is a companion device, e.g., companion device 126, the response may specify an available storage capacity of the companion device. For example, the companion device may be set up to allocate a portion of its storage capacity to the image capture device. In this example, the response may specify the unused portion of the storage capacity of the companion device that is allocated to the image capture device.

While the foregoing discussion of determination of secondary storage capacity describes examples specific to individual secondary storage, e.g., hosted storage service 122, network-attached storage device 124, and companion device 126, more than one secondary storage of each type, or a combination of secondary storage of different types, may be determined as available and a response may be received from each available secondary storage. The secondary storage capacity may be determined based on a combination of the responses, e.g., adding the secondary storage capacity specified in each response. In some implementations, secondary storage may be set up in mirroring mode, e.g., hosted storage service 122 and network-attached storage 124 may be set up to mirror each other's data. In these implementations, the secondary storage capacity may be determined as the storage capacity of one of the hosted storage service 122 and network-attached storage 124, that is, the combination may include setting the storage capacity as one of the storage capacity of the hosted storage service 122 and network attached storage 124.

In block 308, total storage capacity may be determined. In some implementations, when it is determined in block 306 that the secondary storage is available, the total storage capacity may be determined as a combination, e.g., a sum of the local storage capacity determined in block 304 and the secondary storage capacity, e.g., based on one or more responses from secondary storage. In some implementations, when it is determined in block 306 that the secondary storage is not available, the total storage capacity may be determined as the local storage capacity determined in block 304, e.g., based on one or more local storage devices. In some implementations, the total storage capacity can be based on one or more local storage devices without checking for secondary storage.

In block 310, image capture settings for an image capture device, e.g., image capture device 102, may be determined. In various implementations, image capture settings may include settings related to how an image capture device captures an image or a video, e.g., the image capture device 102 executing the camera application 103. For example, image capture settings may include one or more of an image resolution, an aspect ratio, a compression setting, a camera mode, etc.

In various implementations, image capture settings may be configurable by a user, e.g., user 125, via a user interface. For example, a user interface may be presented, e.g., by camera application 103 that permits a user, e.g., user 125, to select from one or more pre-set resolutions such as 640×480 pixels, 1280×1024 pixels, High-Definition video, 4K video etc. In another example, the user interface may permit the user to customize the resolution, e.g., to a value not specified in the one or more pre-set resolutions.

In various implementations, image capture settings may include an aspect ratio for an image or a video captured by image capture device 102. For example, a user interface, may be presented e.g., by camera application 103 that permits a user, e.g., user 125, to select from one or more pre-set aspect ratios such as 4:6, 5:3, 16:9, 1:1, etc. In another example, the user interface may permit the user to customize the aspect ratio, e.g., to a value not specified in the one or more pre-set aspect ratios. In some implementations, the aspect ratio may be set automatically without user input. For example, the aspect ratio may be set as 16:9, e.g., when the image capture device is held horizontally or in landscape orientation. In another example, the aspect ratio may be set as 1:1.

In various implementations, image capture settings may include a compression setting for an image or a video captured by image capture device 102. For example, a user interface, may be presented e.g., by camera application 103 that permits a user, e.g., user 125, to select from one or more pre-set choices such as raw image (e.g., store image data in raw form, with zero compression), lossless compression, normal compression, high compression etc. In another example, the user interface may permit the user to customize the compression setting, e.g., to a value not specified in the one or more pre-set choices. For example, the user may select the compression ratio such that a size of an image captured by the image capture device 102 does not exceed a size threshold. In some implementations, the compression setting may be selected automatically without user input.

In various implementations, image capture settings may include a camera mode for the image capture device 102. For example, a user interface may be presented, e.g., by camera application 103, that permits the user to select from one or more pre-set choices such as a plain mode, a photo sphere mode, a panorama mode, a lens blur mode, a video mode, a slow motion mode, etc. Various modes may configure the camera application 103 to capture a video or image with different storage requirements. While some examples of camera modes are described here, it will be understood that any number of different modes may be presented by a camera application, to permit capture of images with different parameters of: color, e.g., plain, sepia, greyscale, specific tint, etc.; effect, e.g., distortion, focal point, saturation, etc.; motion, e.g., animation, animation in specific portions of images, etc.; and other parameters.

For example, in a plain mode, the camera application 103 may capture an image without applying any effects. In another example, in a photo sphere (e.g., spherical image) mode, the camera application 103 may capture and process the image providing areas not all displayed at once such that, e.g., the image is suitable for a virtual reality or an augmented reality display. In another example, in a panorama mode, the camera application 103 may capture a panorama image, e.g., by capturing multiple images and stitching them together to form a final image as a panorama. In another example, in a lens blur mode, the camera application 103 may capture multiple images and process them to form an image such that a final image permits the user or other viewer to set a focus area, at a time after the image is captured. In various implementations, a storage size to store the image in the photo sphere mode, panorama mode, or lens blur mode may be higher than that to store for an image in the plain mode.

In another example, in a video mode, the camera application 103 may capture a video, e.g., at the selected resolution, and at a particular frame rate, e.g., 25 frames per second, 30 frames per second, etc. In another example, in a slow motion mode, the camera application 103 may capture a video with higher frame rate, e.g., 60 frames per second, 120 frames per second, etc., such that the video may be played back at a slower rate without loss of quality. In various implementations, a storage size to store the image in slow motion mode may be higher than a storage size to store an image in the video mode.

In another example, the user interface may permit the user to customize the compression setting, e.g., to a value not specified in the one or more pre-set choices. For example, the user may select the compression ratio such that a size of an image captured by the image capture device 102 does not exceed a size threshold. In some implementations, the compression setting may be selected automatically without user input, e.g., based on one or more of a default setting, user preferences, a stored history of compression settings used previously by the user and/or by the image capture device (if user consent has been obtained), etc.

Figure 4:
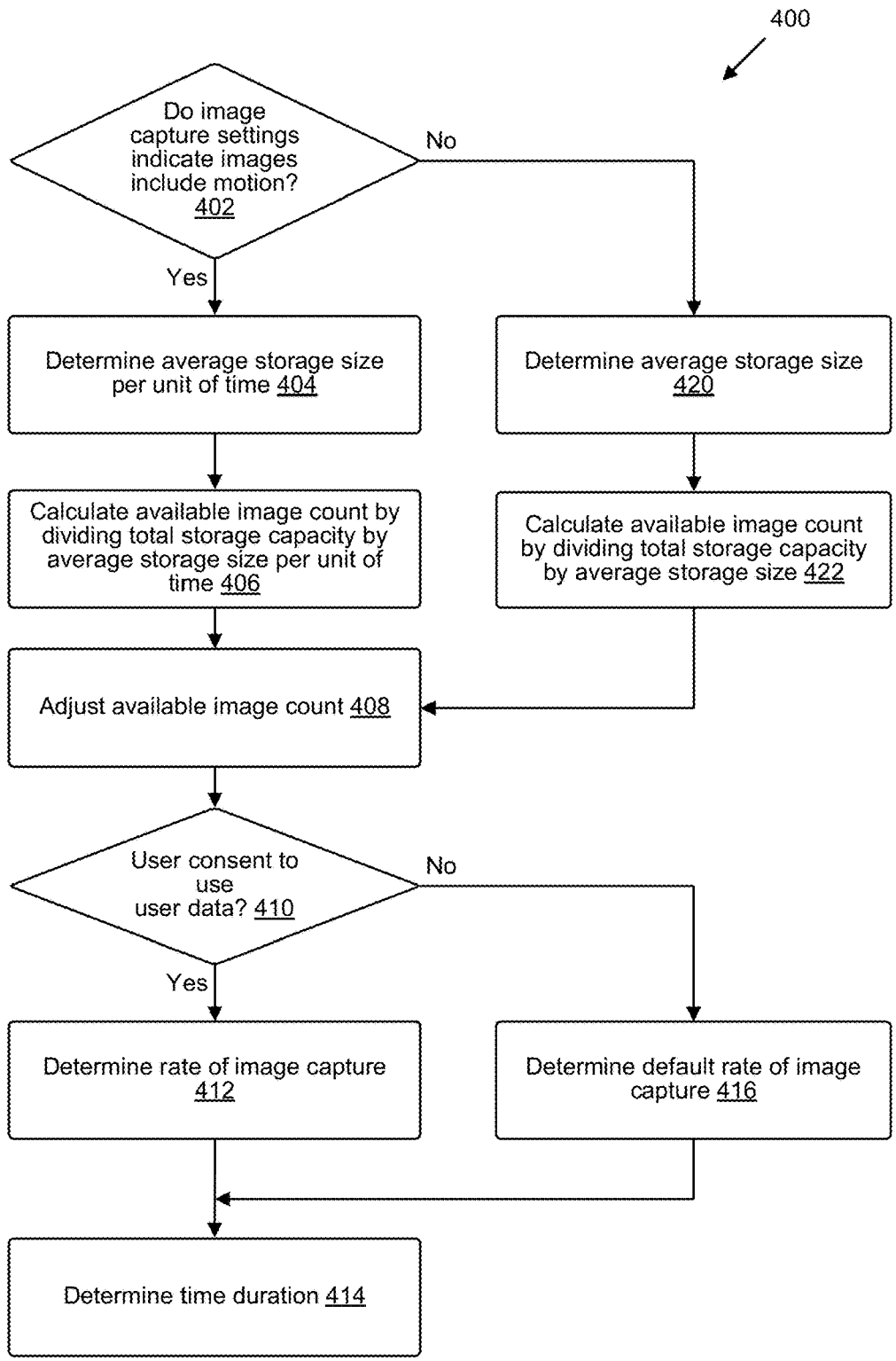
FIG. 4 illustrates a flowchart of an example method to calculate available image capacity, according to some implementations.

In block 312, available image capacity may be calculated. FIG. 4 illustrates an example method by which the available image capacity may be calculated.

In block 314, the available image capacity may be caused to be displayed. In some implementations, the available image capacity may be displayed on a display of the image capture device, e.g., display 241. In some implementations, the available image capacity may be displayed on a display of a companion device, e.g., companion device 126. FIGS. 5A-5D show some example user interfaces that display available image capacity. Various implementations can display total available storage capacity, and/or can display the storage capacities available on particular types of storage and/or devices of storage. For example, the total local storage capacity and total secondary storage capacity (e.g., over network 115) can be displayed as multiple capacities. In further examples, the available capacities on each integrated local storage device (e.g., internal flash memory), each local removable storage device (or a total capacity on all removable storage items), and each secondary storage device can be displayed. If particular storage or storage devices are not available (e.g., secondary storage), these statuses can be displayed or otherwise output on the image capture device.

In some implementations, e.g., when the image capture device is capable of audio playback, display of available image capacity may include providing the user with audio that indicates the available image capacity. In different implementations, the available image capacity may be displayed with any combination audio, video, text, etc. In implementations where the image capture device includes other mechanisms to interact with the user, e.g., force feedback hardware, light indicators such as light-emitting diode (LED) indicators, etc., the available image capacity may be displayed with such mechanisms. The method may continue to block 316.

In block 316, the image capture settings may be adjusted, e.g., by the image capture device, based on the available image capacity. For example, if the device determines that the available image capacity is relatively low, the image capture settings may be adjusted accordingly, e.g., to a lower resolution. In some implementations, the image capture settings may also be adjusted based on the rate of image capture, in addition to the available image capacity. For example, if the available image capacity is determined by the device to be relatively low and the past rate of image capture of the image capture device is determined by the device to be relatively high, the image capture settings may be adjusted to disable certain settings, e.g., higher resolution (e.g., 4K) video or images, that may correspond to a higher storage requirement. In various implementations, some or all of the image capture settings can be adjusted based on user input, e.g., that is input to a displayed interface on the image capture device that presents one or more user-modifiable image capture settings.

In some implementations, information and/or options can be output by the image capture device to inform the user of current storage capacity and allow the user to select desired adjustments to image capture settings based on available storage capacity. For example, the user can be allowed to free up more image storage capacity. For example, a notification (e.g., an alert) can be output on the display of the image capture device to indicate that only a particular amount of images (or duration of video, etc.) can be still be captured and stored by storage available to the image capture device. Notifications can also or alternatively be output as audio, haptic output, etc. For example, a notification can be displayed in response to a threshold amount of storage capacity remaining (e.g., expressed as percentage of total capacity, number of captured images, and/or duration of captured video that can be stored). Further notifications can be displayed for additional, lower thresholds as additional storage capacity is used. For example, an initial threshold and notification provided at 20 images remaining, and an additional notification for each increment of 5 images fewer remaining below 20. A notification can also inform or remind the user to connect to secondary storage (if secondary storage is not currently available to the image capture device) so that additional storage capacity can be obtained, e.g., by uploading photos from the device to remote secondary storage. Some implementations can allow a user to set one or more thresholds and/or other conditions triggering a notification for output from the device.

In addition or alternatively, one or more notifications, options, and/or suggestions can be displayed to allow the user to free up image storage capacity. For example, in some implementations, options can be output (e.g., displayed) by the image capture device in response to any of a variety of conditions, or can be output in response to a command by the user. For example, these options can be displayed in response to the device not being able to communicate with remote storage, e.g., unable to upload images or video to the remote storage, and/or reaching one or more particular thresholds for the amount of storage capacity remaining. For example, an option can be displayed, selectable by the user, to change one or more image capture settings, including lowering resolution of images and/or video that are captured. In some examples, the device can display a single option that, when selected, reduces capture resolution of the image capture device to a default or preferred value, or a suggested resolution value based on the available storage capacity and estimations of predicted future storage capacity needs as described herein. In additional examples, the device can display a menu of selectable resolutions and/or an input field allowing the user to input a desired lower resolution. After user input specifies the lower resolution, the image capture device captures further images at that resolution. Updated information can also be displayed indicating how many more images (or remaining video duration) may be captured and stored at the new, lowered resolution. In some implementations, the image resolution (and/or other image capture settings) can be automatically changed back to default or user-preferred settings in response to a threshold amount of storage capacity being freed, e.g., if a threshold number of images are deleted, are copied from local storage to secondary storage, and/or are copied from the capture device's image storage capacity to other storage.

In various implementations, other conditions can be used to cause the notifications related to storage capacity to be output by the image capture device. For example, the geographic location of the user (e.g., based on geographic location sensors such as GPS, and obtained if consent of the user has been received) can cause a notification, e.g., if the user is at a known vacation, scenic, or tourist location that may indicate greater need for storage capacity for captured images and videos. The occurrence of events attended by the user (e.g., social events such as picnics, weddings, parties, music concerts, etc., as determined based on accessing the user's calendar on accessible storage if user consent has been obtained) can cause notifications in some implementations. In additional examples, the occurrence of a particular time of day (e.g., a time period in which sunsets are seen), other time period, day of the month, day or week of the year (e.g., holiday), etc. can cause notifications in some implementations.

In some implementations, a list identifying particular programs (e.g., applications) running on the image capture device can be displayed in response to reaching a storage capacity limit or threshold. One or more such programs may be able to temporarily allocate storage space on the image capture device normally used for program resources to storage of images and/or videos captured by the device. For example, the user may be allowed to select which program(s) can perform this allocation of storage space to store images and videos. The allocated storage space can be reclaimed by the program(s) after images and video stored therein are removed, e.g., uploaded to secondary storage or other storage. Notifications (e.g., reminders) can be output from the device to notify the user to instruct removal of the images and videos from the temporarily allocated storage (e.g., a control can be displayed to allow the user to instruct this removal with a single command, in some implementations).

Some implementations can output information, options, and/or notifications (e.g., alerts or reminders) to the user relating to save settings, e.g., the use of local storage and/or secondary storage. For example, identifications of the various storage devices available to the image capture device can be displayed, including integrated storage devices, removable storage devices, secondary storage devices available over network 115, and/or temporarily-available storage devices. The display can include indications of the current and/or predicted future availability of these devices and the storage capacity of these devices. For example, the user can select particular image content (images and/or videos) stored in any of these storage devices (e.g., by selecting from a list of the stored image content displayed by the image capture device) to transfer selected content to one or more other desired storage devices.

In some implementations, some or all of the secondary storage capacity can be used as a backup service provided by a backup application or integrated in another application running on the image capture device. The backup function allows storage of additional copies of images and videos that may also be stored on other storage, e.g., local storage. In some implementations, a backup function can cause images and videos on a first type of storage available to the image capture device (e.g., local storage) to be moved to a second, different type of storage (e.g., secondary storage over network 115), e.g., such that the images and videos are deleted from the first type of storage and are stored only in the second type of storage (e.g., one or more storage devices of the second type of storage). Various implementations can transfer or copy images and videos from local storage to secondary storage, from one storage device of secondary storage to one or more different storage devices of secondary storage, and/or from secondary storage to one or more local storage devices. In some examples, images or videos can be moved from local storage to secondary storage and can then be deleted from local storage (or reduced to a reduced-size version, e.g., thumbnail or other item) to provide increased local storage capacity. Image and video data that was removed from local storage can still be available to the user from secondary storage using the backup service, and can be transmitted back to the local storage for use on the image capture device if so desired.

In some implementations, images and videos can be moved or copied to different storage under one or more conditions, e.g., from local storage to available secondary storage or vice-versa, or between different devices within local storage or within secondary storage.

For example, in some implementations, the transfer or copying to different storage can take place automatically based on determination of available local storage capacity (e.g., less than a threshold amount of local storage capacity available), available secondary storage capacity (e.g., more than a threshold amount of secondary storage capacity available), and/or based on a periodic schedule (e.g., a transfer or backup occurring every specified number of days, weeks, months, etc.). Metadata of the images and videos can also be moved. In some implementations, identifiers for images and videos can be stored in the different storage, where the identifiers point to associated image and video data stored in other storage. For example, this can allow only the identifiers to be stored by the different storage without the image and video data, e.g., if the image and video data is available from other storage that can be accessed by the image capture device.

In some implementations, particular images and videos can be prioritized to be stored in, and remain stored in, a particular type of storage, e.g., local storage or secondary storage, or a particular type of storage device (e.g., removable storage or integrated storage). For example, images and videos that have been accessed more frequently by the user can be prioritized to be stored in local storage over secondary storage. Similar prioritization of images and videos can also be determined based on one or more other factors (if user consent has been obtained from the user and relevant other users), e.g., user preferences for particular types of image content or other image/video characteristics, social affinity to the user of persons depicted in images (if user consent has been obtained), etc.

Some implementations can output notifications or prompts from the image capture device to notify the user and/or provide options for backup or other copying and transfer operations. For example, a displayed notification can ask for confirmation input from the user that will cause the device to perform the transfer of image and video data from one storage (e.g., local storage) to the different storage (e.g., secondary storage). In some implementations, the notification (or other prompt) can be displayed with a number of backup settings or save settings that allow the user to indicate or select which images or videos are to be transferred to other storage, which storage or storage devices to transfer those images and videos to, and/or other backup settings (e.g., conditions when transfers occur, the types of data to transfer (e.g., images or videos), etc.).

Suggestions can also be displayed to the user related to storage options. For example, suggestions can be related to adjusting the available image storage capacity, e.g., how much storage capacity to free on indicated storage devices, which image capture settings to adjust, and/or the values to set for these settings, to free an indicated amount of storage capacity (e.g., expressed as a percentage of total image capacity or a particular amount of capacity). Suggestions can include indications as to when to start transferring or copying data to different storage, which images and videos to transfer, which type of storage or particular storage devices to transfer those images and videos to, etc. For example, such suggestions can be based on the current amount of available storage capacity and the sizes of the stored images and videos (e.g., suggesting to transfer a number of image and video files to free a particular amount of space, or suggesting to transfer the largest image and video files), current or estimated availability status of secondary storage, and/or priorities of particular images and videos as described above. Suggestions can be based on, if user consent has been obtained, determination of stored images and videos that the user is likely to want to access from local storage in the future based on previous patterns of user views of stored images (e.g., based on time of capture, determined image content using one or more image object detection techniques, etc.). In some implementations, the image capture device can receive user input that selects one or more particular suggestions, e.g., from multiple presented options and suggestions. For example, a user can select a single displayed control (e.g., button) to accept all suggestions, can individually select particular suggestions, or can modify one or more suggestions to user-desired values or operations.

In some implementations, one or more thresholds described herein for providing notifications, options, transfer of data, suggestions, etc. can be determined by monitoring the usage of the device, if consent has been obtained from the user. For example, the threshold level can be determined from historical usage of a camera application by the user, e.g., based on the average or typical amount of available storage capacity present at times when the user removed or freed storage capacity in the past.

While method 300 has been described with reference to various blocks in FIG. 3, it may be understood that techniques described herein for display of available image capacity may be performed without performing some of the blocks of FIG. 3, e.g., block 316 in which image capture settings are adjusted. In some implementations, additional blocks not shown in FIG. 3 may be additionally performed. In various implementations, the blocks described in FIG. 3 can be performed in a different order than shown and/or simultaneously (partially or completely) with other blocks, e.g., in parallel, where appropriate. Some blocks can be performed and later performed again. In some implementations, blocks can be performed multiple times, in a different order, and/or at different times in the methods. In various implementations, some of the blocks may be combined. In some implementations, the methods can be implemented, for example, on an image capture device 102 as shown in FIG. 1.

FIG. 4 illustrates a flowchart of an example method 400 to calculate available image capacity, according to some embodiments. In block 402, it may be determined whether the image capture settings indicate that the image capture device 102 is currently configured to capture images that include motion. For example, if the image capture settings indicate a camera mode "panorama," "photo sphere," "plain," etc., it may be determined that the image capture device is currently configured to capture images that do not include motion, e.g., static images. In another example, if the image capture settings indicate a camera mode "video," "slow motion," "animation," etc., it may be determined that the image capture device is currently configured to capture images that include motion. If it is determined that the image capture device is currently configured to capture images that include motion, block 404 may be performed. If it is determined that the image capture device is currently configured to capture images that do not include motion, block 420 may be performed.

In block 404, an average storage size per unit of time may be determined for images that include motion. For example, when the image capture settings include a camera mode "video" and a resolution 4K, a total storage size, e.g., in megabytes, of videos captured with the image capture settings by an image capture device may be determined. Further, a total duration of the videos may be determined. In this example, the average storage size per unit of time, e.g., one second, five seconds, etc., may be determined based on the total storage size and the total duration of the videos, e.g., by dividing the total duration of the videos by the total storage size. The average storage size per unit of time may be indicated in a suitable unit, e.g., a particular number of megabytes per second, a particular number of gigabytes per hour, etc. The method may continue to block 406.

In block 406, an available image count may be calculated, e.g., by dividing the total storage capacity, e.g., the total storage capacity determined in block 308 of FIG. 3, by the average storage size per unit of time. For example, if the total storage capacity is 1 gigabyte, and the average storage size per unit of time is 10 megabytes per second, the available image count may be determined as 100 seconds. In this example, the available image count can indicate the duration of video data that can be stored. The method may continue to block 408.

In block 408, in some implementations, the available image count may be adjusted. For example, the available image capacity may be adjusted. In some implementations, the available image capacity may be adjusted to a lower value. For example, the adjustment to a lower value can include rounding down the available image count, and/or setting the available image count as 80%, 90%, etc. of the result of dividing the total storage capacity by the average store size or average storage size per unit of time, etc. In another example, the available image count may be adjusted, e.g., to a higher value, by setting the available image count as 105%, 120%, etc. of the result of dividing the total storage capacity by the average store size or average storage size per unit of time, etc. In some implementations, the available image count may not be adjusted, e.g., block 408 may not be performed.

In some implementations, calculation of available image capacity may include determining a rate of image capture for an image capture device, e.g., the image capture device 102. In these implementations, blocks 410, 412 or 416, and 414 may be performed.

In block 410, it may be determined whether the user of the camera application 103, e.g., user 125, has provided consent for the use of user data, e.g., one or more images captured by the user and stored in the local storage and/or the secondary storage. If it is determined that the user has provided consent for the use of user data, block 412 may be performed. If it is determined that the user has not provided consent for the use of user data, block 416 may be performed.

In block 412, a rate of image capture may be determined. In some implementations, the rate of image capture may correspond to an average number of images, including videos, that the user captures in a period of time. For example, if the user 125 takes an average of 100 photos per week, the rate of image capture may be determined as 100 photos per week. In this example, the rate of image capture may be further determined based on image capture settings associated with the images and videos that the user captured in the period of time, e.g., the rate of image capture may be determined as 10 panoramas, 5 photo spheres, 15 videos, and 70 plain images per week. In some implementations, the rate of image capture may correspond to an average number of images that the user captures at a certain of time of day, day of the week, holidays, etc.

In some implementations, the rate of image capture for the image capture device may be determined as a past rate of image capture based on historical data about the image capture device and/or about the user. For example, when the user consents to use of user data, images captured by the image capture device may be analyzed to determine a type of the image, a date and/or time of capture of the image, etc. A past rate of image capture may be determined based on the analysis. For example, if it is determined that the image capture device captured an average of 500 lens blur images every month in the past year, the past rate of image capture may be determined as 500 lens blurs per month. Some implementations can determine an image capture rate based on images captured by the same user across multiple devices. In some implementations, images captured in the recent past from a current time, e.g., past day, past week, past month etc., may be assigned a higher weight than those from distant past, e.g., more than a year ago, in calculation of the past rate of image capture. In some implementations, the past rate of image capture may be calculated for different image capture settings, e.g., 4K resolution and video, 1:1 aspect ratio and lens blur, etc. In some implementations, the past rate of image capture may be calculated as an aggregate past rate of image capture, averaged for different image capture settings, e.g., as a simple average, as a weighted average, etc.

In some implementations, the rate of image capture for the image capture device may be determined as a predicted rate of image capture. The predicted rate of image capture may be based on one or more of a current location of the image capture device, a current time, and an identity of the network, e.g., network 115, that the image capture device is coupled to. For example, a relatively high rate of image capture may be predicted in specific locations, e.g., a user's home, a tourist destination that is a popular photography spot, etc. In another example, a different rate of image capture may be predicted for different time periods (e.g., time of day, months, seasons, etc.), which can be based, for example, on analysis of past images captured by the image capture device (if user consent has been obtained). For example, if the analysis of past images indicates that the user captures more images in the evenings than mornings, a higher rate of image capture may be predicted for evenings. In another example, if the analysis of past images indicates that the user captures less images in the winter than in the summer, a lower rate of image capture may be predicted for summer. In another example, it may be determined that the user captures a higher number of images when coupled to a home network and a work network, than when not coupled to either of these networks. In this example, a lower rate of image capture may be predicted when the image capture device is not coupled to either of the home network and the work network. In various implementations, the predicted rate of image capture may be based on a combination of these and other factors.

In some implementations, the rate of image capture may be based on a user's schedule. For example, when the user provides consent to use of the user's schedule, e.g., as available from a calendar application, an e-mail application, a clock application etc., the user's schedule may be analyzed to identify one or more events. For example, if the user's schedule indicates a holiday during a particular time period, a different rate of image capture may be predicted for that time period. In another example, if the user's schedule indicates a birthday party that the user plans to attend, a different, e.g., higher, rate of image capture may be predicted for a time period that includes the birthday party. In another example, if the user's schedule indicates a time period of inactivity, e.g., sleep, such as based on a do not disturb setting or an alarm setting in a clock application, a zero rate of image capture may be determined for the time period of inactivity. The method may continue to block 414.

In block 414, a time duration may be determined based on the rate of image capture and the available image count. For example, the time duration can be an estimate of an amount of time after which the remaining available image storage capacity will be filled by captured images, based on the determined rate of image capture. In some implementations, the available image count may be divided by the rate of image capture to obtain the time duration. For example, if the available image count is 500 and the rate of image capture is 50 images per day, the time duration may be determined as 10 days. In another example, if the available image count is 100 minutes and the rate of image capture is 5 minutes per week, the time duration may be determined as 20 weeks, or 5 months.

If it is determined in block 410 that the user has not provided consent for the use of user data, block 416 may be performed. In block 416, a default rate of image capture may be determined. In some implementations where other users provide consent for use of their respective user data, the default rate of image capture may be based on an aggregate average rate of image capture across the other users that have provided consent. In some implementations, the default rate of image capture may be set at particular values, e.g., 100 images per day, 1000 images per day, 5 videos per day, etc. The method may continue to block 414.

If it is determined in block 402 that the image capture settings indicate that images, e.g., captured with the image capture settings, do not include motion, block 420 may be performed. In block 420, an average size of images captured with the image capture settings may be calculated. For example, when the image capture settings include a camera mode "panorama" and a resolution 1280×1024, an average storage size of panorama images captured by an image capture device, e.g., image capture device 102, at the resolution 1280×1024 may be determined, e.g., in megabytes.

In some implementations, the average storage size may be based on images stored in the local storage accessible to the image capture device. In some implementations, the average storage size may be based on images stored in the local storage and secondary storage. In some implementations, the average storage size may be based on images stored in the secondary storage. In some implementations, when users of camera application 103 consent to such use of their data, an average storage size for images with different image capture settings may be determined, e.g., by aggregating the average size across images stored by multiple users. The method may continue to block 422.

In block 422, an available image count may be determined. In some implementations, the available image capacity may be determined by dividing the total storage capacity by the average storage size. For example, if the total storage capacity is 100 megabytes and the average storage size is 10 megabytes, the available image capacity may be determined as an available image count, e.g., 10 images, indicating that the camera application 103 can capture and store 10 images at the current image capture settings. The method may continue to block 408, described above.

While method 400 has been described with reference to various blocks in FIG. 4, it may be understood that techniques described herein to calculate available image capacity may be performed without performing some of the blocks of FIG. 4, e.g., blocks 410-416. In some implementations, additional blocks not shown in FIG. 4 may be additionally performed. In various implementations, the blocks described in FIG. 4 can be performed in a different order than shown and/or simultaneously (partially or completely) with other blocks, e.g., in parallel, where appropriate. Some blocks can be performed and later performed again. In some implementations, blocks can be performed multiple times, in a different order, and/or at different times in the methods. In various implementations, some of the blocks may be combined. In some implementations, the methods can be implemented, for example, on an image capture device 102 as shown in FIG. 1.

FIGS. 5A-5D each illustrate a graphic representation of a user interface that displays image capacity, according to some embodiments. In some implementations, the user interface can be displayed by the image capture device, e.g., a client device or server device, using a display, e.g., display 241. Certain reference numerals are omitted from FIGS. 5B-5D for clarity.

Figure 5A:
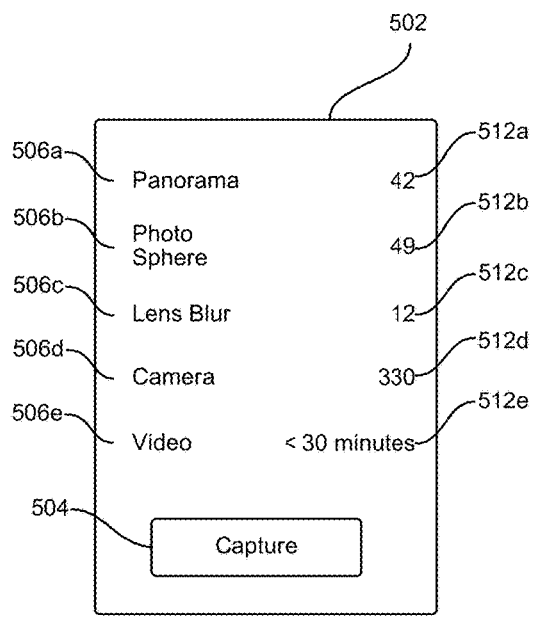
FIGS. 5A-5D illustrate graphic representations of user interfaces that display image capacity, according to some implementations.

In FIG. 5A, a user interface 502 is shown. User interface 502 includes a capture button 504, elements 506a-506e (collectively referred to as elements 506) that indicate image capture settings, and elements 512a-512e (collectively referred to as elements 512) that indicate available image capacity.

In the example shown in FIG. 5A, the elements 506 indicate image capture settings that correspond to camera modes. Each element 506 indicates a respective camera mode, e.g., 506a indicates a panorama mode, 506b indicates a photo sphere mode, 506c indicates a lens blur mode, 506d indicates a camera mode (e.g., plain mode in which images are captured with no effects applied), and 506e indicates a video mode. While five modes are shown in FIG. 5a, any number of modes, e.g., one mode, two modes, may be shown, e.g., based on a particular camera application 103. In some implementations, one particular mode, e.g., a current user-selected mode may be shown, e.g., highlighted or otherwise indicated as selected. In some implementations, camera modes that capture images with motion may be indicated separately from camera modes that capture image with no motion, e.g., static images.

In some implementations, one or more image capture settings, e.g., resolution, aspect ratio, dynamic range, effect, etc. may be displayed instead of, or in addition to camera mode. In some implementations, available image capacity may be displayed, e.g., as a number or text, and elements 506 may be omitted altogether.

Continuing with the example shown in FIG. 5A, one or more elements 512 may be shown, where the elements indicate available image capacity. Each element 512 may correspond to a respective element 506 that indicates image capture settings. For example, in FIG. 5A, element 512a displays "42," indicating that the available image capacity for images captured in the panorama mode, indicated by element 506a, is 42 images; element 512b displays "49," indicating that the available image capacity for images captured in the photo sphere mode, indicated by element 506b, is 49 images; element 512c displays "12," indicating that the available image capacity for images captured in the lens blur mode, indicated by element 506c, is 12 images; element 512d displays "330," indicating that the available image capacity for images captured in the camera mode, indicated by element 506d, is 330 images; and element 512e displays "<30 minutes," indicating that the available image capacity for images captured in the video mode, e.g., motion videos, indicated by element 506e, is for less than thirty minutes duration of video (at standard playback rate). Some implementations can display a message with the available capacity, e.g., "You have 42 images remaining."

In some implementations, the example shown in FIG. 5A may correspond to a situation in which the secondary storage is unavailable. For example, the secondary storage may be unavailable because the network 115 may not meet a speed threshold and/or a reliability threshold, as described previously, with reference to block 306 of FIG. 3. In another example, the secondary storage may be available; however the secondary storage capacity may be zero.

In some implementations, the example shown in FIG. 5A may correspond to a situation in which the local storage capacity is zero. For example, the local storage may be full, e.g., with images or other data, and elements 512 may indicate an available storage capacity of the secondary storage available over network 115 as the available image capacity. In another example, the local storage may be unavailable, e.g., removable storage 110 may be disconnected from image capture device 102, and elements 512 may indicate an available storage capacity of the secondary storage available over network 115 as the available image capacity.

In some implementations, the example shown in FIG. 5A may correspond to a situation in which both local storage and the secondary storage may be available. For example, the local storage capacity may be greater than zero and the secondary storage capacity may also be greater than zero. In this example, element 512 may indicate a total storage capacity based on the local storage capacity and the secondary storage capacity, e.g., a sum of the local storage capacity and the secondary storage capacity.

Figure 5B:
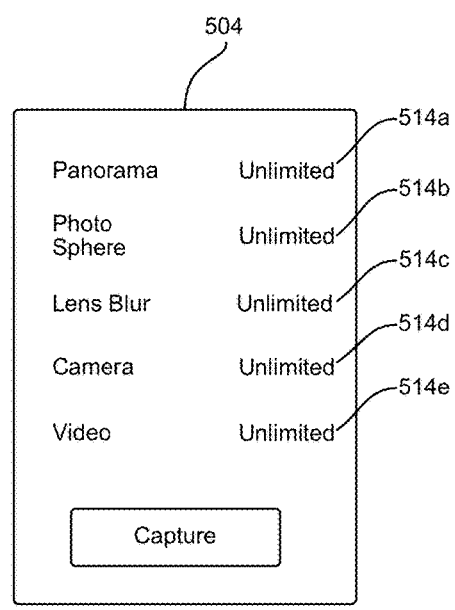

In the example shown in FIG. 5B, elements 514*a*-514*e* (collectively referred to as elements 514) are displayed in user interface 504 and indicate available image capacity. In FIG. 5B, each of the elements 515 display "unlimited." In some implementations, the example shown in FIG. 5B may correspond to a situation in which the secondary storage is available over a network, e.g., network 115, and where the secondary storage is (for practical purposes) unlimited for the user. For example, the secondary storage may be a hosted storage service 122, in which the user 125 has an account with unlimited storage. In another example, the secondary storage may be a network-attached storage device 124, that has a very large capacity, such that even a very high rate of image capture may not exceed the total storage capacity.

Figure 5C:
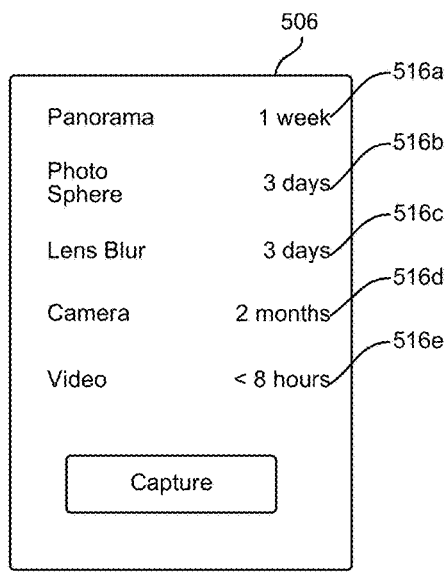

In the example shown in FIG. 5C, elements 516*a*-516*e* (collectively referred to as elements 516) are displayed in user interface 506 and indicate available image capacity. In this example, the elements 516 indicate the available image capacity based on a past and/or predicted rate of image capture, e.g., as described above with respect to FIG. 4. For example, in the panorama mode, the user may capture, on average, a certain number of panoramas in a given time period, e.g., a week. In this example, the available image capacity may be 1 week, based on the rate of image capture, and may be indicated by element 516*a*. Element 516*a* may therefore indicate to the user, e.g., that the available storage capacity may be sufficient for a week of capturing panoramas, at the user's determined rate of image capture when using this image capture device. Element 516*b* may indicate that, in the photo sphere mode, the available image capacity may be sufficient for three days of capturing photo spheres. Element 516*c* may indicate that, in the lens blur mode, the available image capacity may be sufficient for three days of capturing lens blur photos. Element 516*d* may indicate that, in the camera mode, the available image capacity may be sufficient for two months of capturing images. Element 516*e* may indicate that, in the video mode, the available image capacity may be sufficient for videos captured within an 8-hour period. Element 516*e* can differ from element 512*e* in that, element 512*e* indicates a length of time of actual video capture, e.g., a time during which the image capture device 102 is actively capturing video, while element 516*e* indicates a duration of time during which videos may be captured at the determined rate of image capture.

Figure 5D:
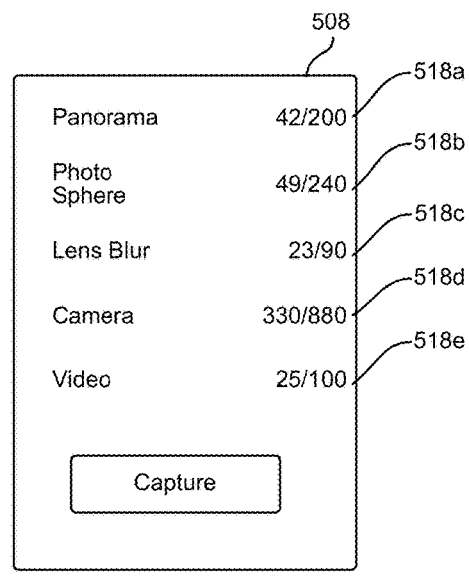

In the example shown in FIG. 5D, elements 518*a*-518*e* (collectively referred to as elements 518) are displayed in user interface 508 and indicate available image capacity. In this example, the elements 518 indicate the available image capacity as a portion of total images, e.g., captured by the user, stored on the local storage, stored on secondary storage, etc. For example, element 518*a* may indicate that the user has captured 42 panoramas out of a total available image capacity allowing 200 panoramas to be stored. In another example, element 518*b* may indicate that the user has captured 49 photo spheres out of a total of 240 photo spheres that may be stored, e.g., with the available image capacity. In yet another example, element 518*c* may indicate that the user has captured 23 lens blur images and the available storage capacity is sufficient for 90 additional lens blur images that may be stored, e.g., with the available image capacity. Similarly, elements 518*d* and 518*e* may indicate the available, used, and/or total available image capacity (at a currently-set image resolution) as a number of images or amount of duration of video (e.g., in seconds).

While each of FIGS. 5A-5D show different user interfaces with elements that display available image capacity, other user interfaces may be utilized. For example, available image capacity may be shown as percentage values, with graphical indicators, e.g., progress bars, as an empty portion of a graphical object, as a film-strip with empty squares corresponding to available image capacity, with symbols, e.g., the Go (infinity) symbol may be used to display unlimited available image capacity, etc.

One or more techniques and methods described herein (e.g., methods of FIGS. 3 and 4) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to adjust image capture settings of an image capture device, the method comprising:
   determining local storage capacity of local storage accessible to the image capture device;
   determining whether secondary storage is accessible to the image capture device over a network;
   determining total storage capacity based at least in part on the determining whether the secondary storage is accessible;
   determining the image capture settings of the image capture device;
   calculating an available image capacity based on the total storage capacity and the image capture settings;
   determining a predicted rate of image capture for the image capture device based on a stored indication of images previously captured by the image capture device on one or more previous days that are previous to a current day; and
   in response to determining the predicted rate of image capture, adjusting the image capture settings of the image capture device based on the available image capacity and the predicted rate of image capture.

2. The computer-implemented method of claim 1, further comprising:
   in response to determining that the secondary storage is accessible, determining a secondary storage capacity of the secondary storage, including:
      sending a query to the secondary storage; and
      receiving a response from the secondary storage, wherein the response specifies the secondary storage capacity.

3. The computer-implemented method of claim 1, wherein determining whether the secondary storage is accessible to the image capture device over the network comprises:
   determining whether a speed of access to the secondary storage over the network meets a speed threshold;
   in response to determination that the speed of access meets the speed threshold, determining that the secondary storage is accessible; and
   in response to determination that the speed of access does not meet the speed threshold, determining that the secondary storage is not accessible.

4. The computer-implemented method of claim 1, wherein determining whether the secondary storage is accessible to the image capture device over the network comprises:
   determining whether a connection to the secondary storage over the network meets a reliability threshold, wherein the reliability threshold is met if a threshold number of previous transfers of data to the secondary storage have been successfully completed over the network;
   in response to determination that the connection meets the reliability threshold, determining that the secondary storage is accessible; and
   in response to determination that the connection does not meet the reliability threshold, determining that the secondary storage is not accessible.

5. The computer-implemented method of claim 1, wherein determining the local storage capacity of the image capture device comprises:
   determining:
      a first storage capacity of a first non-volatile memory of the image capture device, wherein the first non-volatile memory is non-removable; and
      a second storage capacity of a second non-volatile memory coupled to the image capture device and accessible without use of the network, wherein the second non-volatile memory is part of a removable storage device physically coupled to the image capture device; and
   calculating a sum of the first storage capacity and the second storage capacity.

6. The computer-implemented method of claim 1, wherein adjusting the image capture settings comprises adjusting at least one of: a resolution, an aspect ratio, a compression setting, or a camera mode.

7. The computer-implemented method of claim 1, wherein calculating the available image capacity comprises:
   determining an average size of a plurality of images captured with the image capture settings; and
   dividing the total storage capacity by the average size to obtain an available image count, and further comprising:
   causing the available image count to be displayed on a display of the image capture device.

8. The computer-implemented method of claim 1, wherein the images previously captured by the image capture device include still images.

9. The computer-implemented method of claim 1, wherein calculating the available image capacity includes calculating an available image count, and further comprising:
   calculating a time duration after which the available image capacity is predicted to be filled by images captured by the image capture device, wherein the time duration is based on the predicted rate of image capture and the available image count; and
   causing the time duration to be displayed on a display of the image capture device.

10. The computer-implemented method of claim 1, wherein the predicted rate of image capture for the image capture device is based on a current time period of the current day compared to one or more time periods of capture of the images previously captured by the image capture device.

11. The computer-implemented method of claim 1, wherein the predicted rate of image capture is based on an identity of the network, wherein the identity of the network includes one of a home network or a work network.

12. The computer-implemented method of claim 1, wherein the image capture device is associated with a user and wherein determining the predicted rate of image capture for the image capture device comprises:
identifying one or more upcoming events in time periods indicated in schedule data associated with the user; and
determining the predicted rate of image capture based on the one or more upcoming events.

13. The computer-implemented method of claim 1, wherein adjusting the image capture settings includes disabling one or more settings of the image capture device.

14. The computer-implemented method of claim 1, wherein determining the predicted rate of image capture for the image capture device includes averaging an amount of the images previously captured by the image capture device on the one or more previous days.

15. The computer-implemented method of claim 1, further comprising:
causing capture of one or more images by the image capture device based on the adjusted image capture settings; and
causing the one or more images to be stored in at least one of the local storage or the secondary storage.

16. An image capture device comprising:
a local storage coupled to a processor;
a network interface coupled to the processor;
a camera coupled to the processor; and
a display coupled to the processor, wherein the processor is configured to perform operations comprising:
determining local storage capacity of local storage accessible to the image capture device;
determining whether a secondary storage is accessible to the image capture device over a network;
determining total storage capacity based at least in part on the determining whether the secondary storage is accessible;
determining image capture settings of the image capture device;
calculating an available image capacity based on the total storage capacity and the image capture settings;
causing the available image capacity to be displayed on a display device of the image capture device;
causing an option to be displayed by the display device of the image capture device allowing user input to be received by the image capture device to change one or more of the image capture settings, wherein the option is caused to be displayed at a time that is based on the available image capacity and based on a stored average available storage capacity of the image capture device, wherein the stored average available storage capacity is based on previous available storage capacities of the image capture device when storage of the image capture device was previously freed in response to user input received by the image capture device; and
receiving second user input to select the option and change at least one of the one or more image capture settings.

17. The image capture device of claim 16, wherein the processor is further configured to perform operations comprising:
determining whether access to the secondary storage over the network meets a speed threshold and a reliability threshold, wherein the reliability threshold is met if a threshold number of previous transfers of data have been successfully completed to the secondary storage over the network; and
in response to determining that access to the secondary storage meets the speed threshold and the reliability threshold, determining that the secondary storage is accessible.

18. The image capture device of claim 16, wherein the processor is further configured to perform operations comprising:
determining an average size of images captured with the image capture settings; and
dividing the total storage capacity by the average size to obtain an available image count,
wherein causing the available image capacity to be displayed comprises displaying the available image count.

19. A non-transitory computer readable medium with instructions stored thereon that, when executed by a processor, cause the processor to adjust image capture settings of an image capture device, the instructions causing the processor to:
determine local storage capacity of local storage accessible to the image capture device;
determine that a secondary storage is accessible to the image capture device over a network;
based at least in part on determination of that the secondary storage is accessible, determine total storage capacity as a sum of the local storage capacity and a secondary storage capacity of the secondary storage;
determine the image capture settings of the image capture device;
calculate an available image capacity based on the total storage capacity and the image capture settings, wherein calculating the available image capacity includes calculating an available image count;
determine a predicted rate of image capture for the image capture device based on a stored indication of images previously captured by the image capture device on one or more previous days that are previous to a current day;
determine a time duration after which the available image capacity will be filled by captured images, wherein the time duration is based on the predicted rate of image capture and the available image count;
cause the available image count and the time duration to be displayed on a display device of the image capture device; and
in response to the predicted rate of image capture being determined, adjust the image capture settings of the image capture device based on the available image capacity and the predicted rate of image capture.

20. The non-transitory computer readable medium of claim 19, wherein the processor is caused to determine the predicted rate of image capture for the image capture device by at least one of:
averaging an amount of the images previously captured by the image capture device on the one or more previous days;
determining the predicted rate of image capture based on one or more upcoming events identified in time periods indicated in schedule data associated with the user; or determining the predicted rate of image capture based on an identity of the network, wherein the identity of the network includes one of a home network or a work network.

* * * * *